Feb. 15, 1966     S. M. STEBBINGS     3,234,948
CHEESE-FILTER CIGARET
Filed May 12, 1964
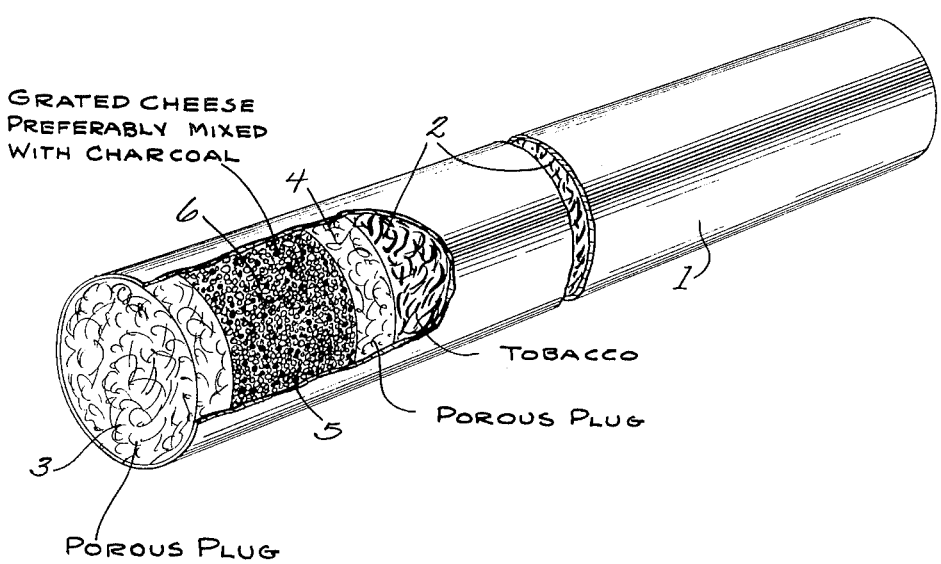
INVENTOR.
STUART M. STEBBINGS
BY
ATTORNEYS

United States Patent Office 3,234,948
Patented Feb. 15, 1966

3,234,948
CHEESE-FILTER CIGARET
Stuart M. Stebbings, P.O. Box 191, De Pere, Wis.
Filed May 12, 1964, Ser. No. 366,740
6 Claims. (Cl. 131—10)

This invention relates to a cheese-filter cigaret and the present application is a continuation-in-part of my application Serial No. 3,655 filed January 20, 1960, now abandoned, which, in turn, was a continuation-in-part of abandoned application Serial No. 734,659 filed June 23, 1958.

This invention contemplates the provision of a cigaret filter which comprises particulate milk derived cheese used alone or in a mixture with particles of charcoal. By preference, the charcoal has been acid washed. In order that the cheese may comprise small and well-defined particles between which the smoke can pass freely, it is preferred to use a hard cheese as exemplified by Parmesan, Romano or Swiss cheese. Aged cheddars and other "hard" cheeses may also be used, particularly if partially dehydrated to facilitate grating, it being important that the cheese be particulate. Since the cheese is just as effective when flavor is wholly lacking, it is contemplated that an inexpensive cheese may be manufactured especially for filter purposes. Essentially, it will be a hard cheese on the order of those listed above and may use a vegetable rennet. While commercial cheeses of the types indicated are perfectly satisfactory, a cheese made especially for filter processes may be lower in cost and more uniform in the qualities desired for this service.

If the cheese is mixed with charcoal, in accordance with the desired practice of the invention, the charcoal is likewise in the form of fine granules or particles. It has been ascertained experimentally that the charcoal is of lesser effect unless the amount of charcoal used is in the approximate range of one-third to one-half of the total of charcoal and cheese. The amounts being so small and the proportions non-critical, it is immaterial whether the proportions be calculated in terms of weight or of volume. In practice, I have used volume with success.

The filter is confined between plugs of any appropriate material capable of restraining the filter material without unduly impeding the passage of smoke. Cotton, or a narrow roll of fibrous material such as paper or fabric, may be employed as a plug.

A mixture of particulate cheese with particulate charcoal will remove a materially higher percentage of tars and nicotine from tobacco smoke than can be removed with grated cheese alone or with pulverulent charcoal alone. Charcoal per se is a relatively poor adsorbent of the tar found in cigaret smoke. In the present filter, the charcoal performs three primary functions other than mere adsorption of tar. In the first place, it adsorbs the oil from the cheese to an extent sufficient to keep the cheese at maximum efficacy as well as keeping it from oiling the cigaret paper in which it is confined. In the second place, it prevents the cheese from becoming rancid and odorous in storage. In the third place, it is one of the functions of the charcoal to promote the flow of smoke in the body of the cheese filter. For this reason, the charcoal is relatively coarse, a physical factor which renders it less suitable for adsorption but more suitable for a cigaret filter in conjunction with cheese. Charcoal of at least 30 mesh or larger has been found very satisfactory but this figure is stated by way of example and not by way of limitation.

It is to be observed that the desired filtering characteristics of the mixture are very largely attributable to the particulate cheese. Such cheese, per se, without charcoal shows very good filtration. Contrary to what might be expected, the drier and less oily the cheese, the better appears to be the result. Hence, the contribution of the charcoal is to adsorb oil and thereby to keep the cheese at maximum efficacy. It is believed that the dry and relatively hard particles of cheese have considerable porosity and that the filtering occurs primarily within the pores of the cheese. The particles of hard cheese are granular as the result of the grating procedures but the preferred cheese particles are likewise porous. In passing, it may be noted that the hard cheese specified as preferred all contain substantial quantities of butter fat in excess of the minimum butter fat percentages believed to be desirable. It is preferred that the cheese particles of the filter contain at least 20–30 percent butter fat. In practice, Romano cheese contains about 39 percent butter fat and Parmesan cheese about 34 percent.

The cheese must be a hard cheese to start with and it has to be relatively aged or artificially dehydrated to facilitate grating. Dehydration is believed to be satisfactory as aging, since the present invention is not concerned with cheese flavor but only with the preparation of the cheese in a manner to render its texture appropriate for the grating or shredding steps which will reduce the cheese to small particles suitable for use in a filter. As already stated, these particles may vary somewhat in size but should be well defined. Since the capacity of the pores of individual particles is limited, there must be clearance to enable some smoke to pass given particles en route to other particles. Accordingly, it is desirable that the particles be of sufficient size so that there will be openings between cheese particles through which smoke flow may occur without undue obstruction.

The drawing fragmentarily illustrates upon an enlarged scale a cigaret having portions broken away to expose the filter structure. The legends indicate in general terms the nature of the materials.

The cigaret paper 1 is filled for most of its length with shredded tobacco 2 in the usual manner. At the end which is introduced between the user's lips is the filter which, in preferred practice, comprises a terminal porous plug 3 and another porous plug 4 which is spaced inwardly, the use of which is optional. The material of these plugs has no bearing on the present invention. Cotton is an acceptable material.

The filter space 5 is filled with a filtering material 6 according to the present invention, such material essentially comprising grated hard cheese. While cheese alone may be used, as disclosed in the companion applications above identified, it has been found very desirable to mix with the particulate cheese a substantial percentage of charcoal so divided that the particles or granules of charcoal will approximate the size of the cheese particles. The charcoal used is known as acid washed, activated charcoal. Charcoal alone gives some filtering effect but it is negligible as compared with the effect of the mixture of charcoal and cheese. The charcoal is desirably acid-washed charcoal, since the acid washing gives results that are considerably better than the results achieved when the charcoal is unwashed.

By way of example, it is desired to note that the sizes of particles of cheese and charcoal which have been found to be appropriate are within the approximate range of 12 x 30 mesh. I have used successfully charcoal in a range of sizes from 50 x 20 (the smallest) to 4 x 6 (the largest). The six commercial designated sizes of charcoal most popular in the indicated range are known as 4 x 6, 4 x 8, 8 x 12, 12 x 30, 30 x 50 and 50 x 20. There is no commercial standard for determining the sizes of the particles of grated cheese but these should approximate the sizes of the charcoal. Again, the objective is not to limit the invention to this range but merely to indicate, by way of example, the sizes which have been found successfully operative. The more finely the cheese particles and charcoal particles are ground, the higher will be the percentage of tars removed but, obviously, the higher will be the resistance to smoke travel. Accordingly, it is preferred that about half of the cheese be relatively coarsely ground and the remaining half finely ground.

The filter mixture desirably contains at least one-third charcoal and it may contain as much as 50 percent or more charcoal. Proportions are indicated by volume although, as explained above, the amounts used are so small and the ratios so non-critical that the proportions may be determined by weight. It is my experience that if the filter mixture contains more than 30 percent charcoal, the results will be superior. The preferred percentage is one-third charcoal of plus 30 mesh and two-thirds grated or shredded cheese.

If the mixture is one-third charcoal and the remaining two-thirds comprises particulate Parmesan, it has been found possible to remove 61 to 89 percent of the tars. Sixty-one percent is equivalent to the best commercial filter presently available, when tested by the same procedures.

It does not appear to be very material whether the cheese component of the filter is made of one hard cheese or mixtures of these cheeses, in various proportions. As already stated, Swiss, Parmesan and Romano are the three cheeses which have given the best results to date.

I claim:

1. A cigaret filter capable of reducing materially the nicotine and tars in the tobacco smoke, said filter comprising small, well-defined porous particles of hard milk derived cheese having a fat content in excess of 20 percent but being sufficiently dry so that most of the fat is in the interior of the individual particles on the surfaces constituting the walls of pores with which the individual particles are provided and within which filtering occurs.

2. A cigaret filter according to claim 1 in which the cheese comprises grated particles of cheese selected from a group comprising Parmesan, Romano, Swiss and cheddar cheeses.

3. A cigaret filter according to claim 1 in which the cheese is mixed with small particles of charcoal distributed therethrough, the charcoal particles being at least 50 x 20 mesh in size and being present in a ratio to the cheese of at least one-third to one-half charcoal, by volume.

4. A cigaret filter according to claim 3 in which the charcoal is acid washed and present in at least two well-defined sizes of particles both of which are at least as large as 50 x 20 mesh, the total charcoal exceeding 30 percent of the combined cheese and charcoal content of the filter by volume.

5. A cigaret filter according to claim 3 in which the cheese particles approximate the size of the charcoal particles, neither being any larger than 4 x 6 mesh.

6. A cigaret provided with a filter comprising grated particles of milk derived cheese mixed with particles of charcoal, said charcoal being present in the filter in amounts equal to one-third to one-half of the filter material by weight, the remainder of the filter material comprising the said grated cheese which has a butter fat component of at least twenty percent.

References Cited by the Examiner

UNITED STATES PATENTS 2,928,399  3/1960  Touey _____ 131—10

FOREIGN PATENTS 173,262  12/1952  Austria.

SAMUEL KOREN, *Primary Examiner.*

MELVIN D. REIN, ABRAHAM G. STONE, *Examiners.*